United States Patent

[11] 3,569,716

| [72] | Inventor | Virgil Dennis Lewis<br>Beltsville, Md. |
|---|---|---|
| [21] | Appl. No. | 734,063 |
| [22] | Filed | June 3, 1968 |
| [45] | Patented | Mar. 9, 1971 |
| [73] | Assignee | The United States of America as represented by the Secretary of the Army |

[54] OPTO-ELECTRONIC LIQUID LEVEL SENSOR FOR MAINTAINING A STABLE REFERENCE
5 Claims, 5 Drawing Figs.

[52] U.S. Cl.............................................. 250/205;
33/206, 250/218
[51] Int. Cl....................................... G01j 1/32
[50] Field of Search.......................... 250/218,
205, 211 (J); 33/206.5, 206.2 (A), (Inquired), 201

[56] References Cited
UNITED STATES PATENTS

| 2,335,893 | 12/1943 | Altenberg.................... | 356/249 |
| 2,547,310 | 4/1951 | Flint............................. | 33/206.5UX |
| 2,926,530 | 3/1960 | Mueller et al................. | 33/206.5UX |
| 3,134,905 | 5/1964 | Pfann........................... | 250/211J |
| 3,215,843 | 11/1965 | Neil............................. | 250/205 |
| 2,446,096 | 7/1948 | Moore.......................... | 250/218X |
| 3,428,814 | 2/1969 | Doonan........................ | 356/205X |
| 3,464,276 | 9/1969 | Leibert........................ | 33/206.2A |

Primary Examiner—James W. Lawrence
Assistant Examiner—C. M. Leedon
Attorneys—Harry M. Saragovitz, Edward J. Kelly, Herbert Berl and J. D. Edgerton ABSTRACT: An opto-electronic sensor which maintains a stable condition relative to a reference. The sensor utilizes a mercury pool contained in a steel box having relatively small dimensions. Holes in each of the four sides of the box each contain an optical glass window. Photosensitive diodes are mounted outside the windows on two adjacent sides of the box and light sources are similarly mounted on the remaining two sides so that a light source is opposite each diode. The mercury pool is adjusted to a height so as to partially block the light going from each light source to its respective diode. Tilting the box along one axis or the other will increase or decrease the light reaching one or the other of the photosensitive diodes and vary the diode electrical output which can be used to control a self-leveling servo control system.

INVENTOR
V. DENNIS LEWIS

INVENTOR
V. DENNIS LEWIS

BY

ATTORNEYS

OPTO-ELECTRONIC LIQUID LEVEL SENSOR FOR MAINTAINING A STABLE REFERENCE

RIGHTS OF GOVERNMENT

The invention described herein may be manufactured, used, and licensed by or for the Unites States Government for governmental purposes without the payment to me of any royalty thereon.

BACKGROUND OF THE INVENTION

Since the advent of precisely balanced machinery and equipment capable of achieving very close tolerances, a problem has existed of maintaining a stable level condition relative to some reference. The most precise level detectors in current use require manual sighting and adjustment and frequently can be leveled in one direction only. The same holds true of electronic devices which also tend to be less accurate and more expensive than their mechanical counterparts. Additionally, there is no detector available which is capable of electronically sensing a milliradian tilt away from the horizontal plane of a standard motor driven antenna pedestal and converting this change to a correctional signal of sufficient amplitude to drive a servo control system. Previous attempts to solve this problem involved conversion of existing optical and electronic devices to servo drive controls. While some of these attempts proved feasible, the complexity of the resulting devices and the construction tolerances required were felt to be too demanding for realistic consideration. For example, the positioning of a point light source and a photodetector on either side of spirit level or variable resistance contacts inside a mercury chamber required extremely close construction tolerances in order to achieve one milliradian accuracy. Switching devices such as a mercury switch which would give an on-off condition were considered but the threshold of such a switch created instability when 1 milliradian tolerances were attempted.

It is therefore an object of this invention to provide an opto-electronic sensor which is capable of electronically sensing a 1 milliradian tilt in the plane on which the sensor lies.

An additional object of the present invention is to provide an opto-electronic sensor capable of maintaining a stable reference in both the level and cross-level directions.

Another object of the invention is to provide an opto-electronic sensor which is inexpensive and simple to construct.

Still another object of the invention s to provide an opto-electronic sensor which will allow remote leveling of equipment located in areas too dangerous for personnel.

A further object of the invention is to provide a level sensing device which can be easily adapted to a servo control system for maintaining a stable level condition.

SUMMARY OF THE INVENTION

Briefly, in accordance with the invention, an opto-electronic liquid level sensor is provided for maintaining a stable reference. The sensor comprises a small container with a mercury pool therein. A hole in each of the four walls of the container is covered by an optical glass window. Photosensitive diodes are mounted in two adjacent walls of the container outside the windows. On the walls opposite each diode is an externally mounted light source. The mercury level is adjusted to partially block the light from the light sources to the photosensitive diodes. Any change in the stable condition of the container in either the level or cross-level directions will be indicated by a corresponding change in the current from the respective diodes. Such current is then utilized to drive servo control units to bring the system back to the stable reference.

DESCRIPTION OF THE DRAWINGS

The specific nature of the invention as well as other objects, aspects, uses, and advantages thereof will clearly appear from the following description and from the accompanying drawings, in which.

DESCRIPTION OF THE PREFERRED EMBODIMENT

Figure 1:
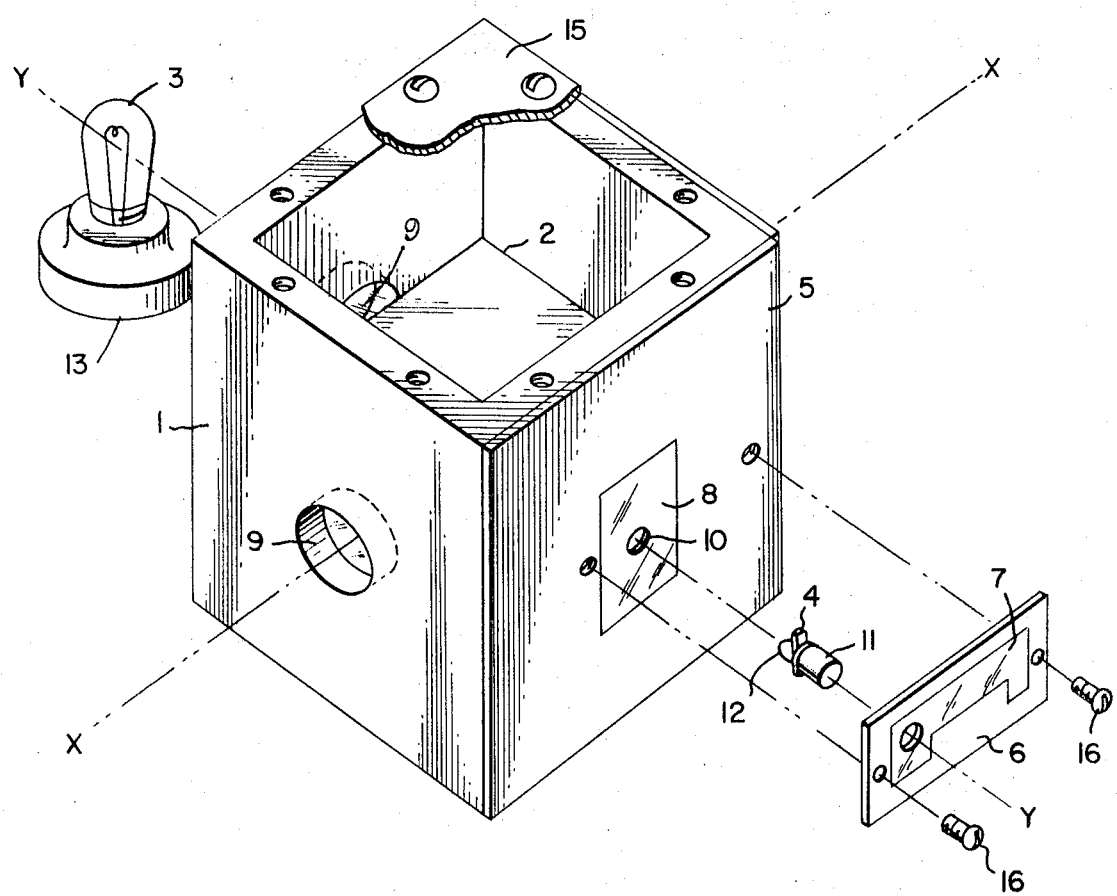
FIG. 1 is a partially exploded isometric view of an opto-electronic sensor in accordance with my invention.

FIG. 1 shows an opto-electronic sensor with some of its components drawn in an exploded view for the purposes of clarity. Also for clarity, the sensor elements are only shown along the y axis. It should be understood that the sensor components may be similarly placed along the x axis. The opto-electronic sensor comprises a photodiode 4, incandescent lamp 3, and a mercury pool 2, in container 1. The container 1 is a steel box having outside dimensions 1 × 1 × 1 inches. This dimension may be increased or decreased, but the mercury pool 2 should have sufficient volume to prevent its separation within the container 1. The outside dimensions may be arbitrarily chosen. Steel is used for the container material to eliminate any chemical reaction with the mercury pool 2. Alternatively, the mercury container can be made out of any material which will not react to the mercury, for example, glass or plastic material which would eliminate the need for glass windows, but would be more fragile than steel. Diode mounting hole 10, through which the diode 4 will detect the amount of light passing over the mercury pool 2, is bored through the side of the container 1. Hole 10 is covered with small optical glass window in order to prevent the mercury from leaving the container 1. To give the mercury pool sufficient depth, the center line of the mounting hole 10 should be located on the centerline of the container 1 and 0.2 inches above the bottom of the mercury pool 2. The distance from any plane surface of an item to be leveled, to the center lines of the identical mounting holes 10 on the x and y axis of container 1 must not differ by more than 0.005 inches. This enables the surface of the mercury pool 2 to cover approximately the same amount of surface area on the diodes 4 in the x an y axes when the container 1 is level.

The anode contact board 5 is a thin edged circuit board having thereon a copper strip 8 surrounding the mounting hole 10 which is large enough to make contact with the protruding flanges on the diode 4. The board 5 is long enough to attach a wire to it after the diode 4 has been inserted into the mounting hole 10 and fastened down with the cathode contact board 6. The diode cathode 11 is soldered to the copper strip 7 on the cathode contact board 6 before insertion into the mounting hole 10. The cathode contact board 6 is attached to the container 1 by small screws 16, thus creating the pressed anode contact.

Opposite the mounting hole 10, another hole 9 is made in the side of container 1 and covered with an optical glass window. The diameter of the hole is larger than hole 10 and should be large enough to insure illumination of the diode 4 without precise positioning of the incandescent lamp 3. Some adjustment of the lamp 3 position may be necessary to obtain maximum output from the diode 4 when the sensitive portion 12 of the diode 4 is fully illuminated. To accomplish this the lamp socket 13 is attached to the container 1 in a way which will later allow a rough adjustment of its position relative to the diode 4.

The last step in the construction of the opto-electronic sensor is to package the basic configuration and the electronics necessary to process the diode output. The electronics may be attached to the box itself, as in the case of the system described below, or they may be packaged separately since the only physical connections are those to the diodes 4 and lamps 3. A lid 15 should be provided to seal the box 1 from impurities and to prevent leakage if the unit is turned upside down.

Figure 2A:
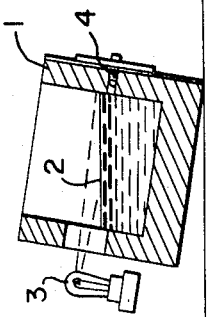
FIGS. 2A, 2B and 2C illustrate the operation of my opto-electronic sensor.
Figure 2B:
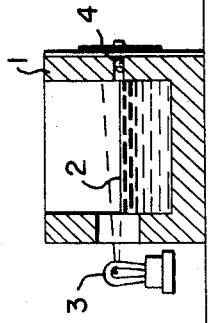
Figure 2C:
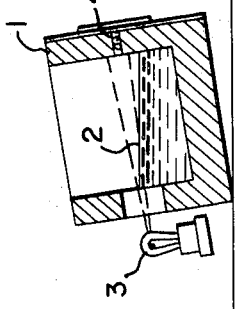

Operation of the opto-electronic sensor is illustrated in FIGS. 2A, 2B and 2C. The sensor works on the principle that a liquid surface tends to remain horizontal regardless of the orientation of its container. FIG. 2B shows the photosensitive diode 4, incandescent lamp 3, and mercury pool 2 in container 1 in a level orientation. In this condition the mercury surface lies in such a manner as to block approximately half of the diode 4 from the lamp illumination. Under these conditions the diode output will be approximately half of its maximum. FIG. 2C shows the left end of the unit tilted upward causing diode 4 to be completely covered, thus blocking all photo diode illumination. In this configuration the output of the diode will be at its minimum. When the right end of the unit is tilted upward as in FIG. 2A, the mercury pool 2 leaves the diode 4 completely exposed and therefore its output will be at a maximum. The amount the unit is tilted is proportional to the diode output which is amplified and recorded in some way commensurate with the leveling problem at hand. The operation described may also be applied along the axis perpendicular to the direction shown in FIGS. 2A, 2B and 2C. The interaction between the tow directions, level and cross-level, amounts to no more than that found in the manual leveling of a surface, using a spirit level.

Figure 3:
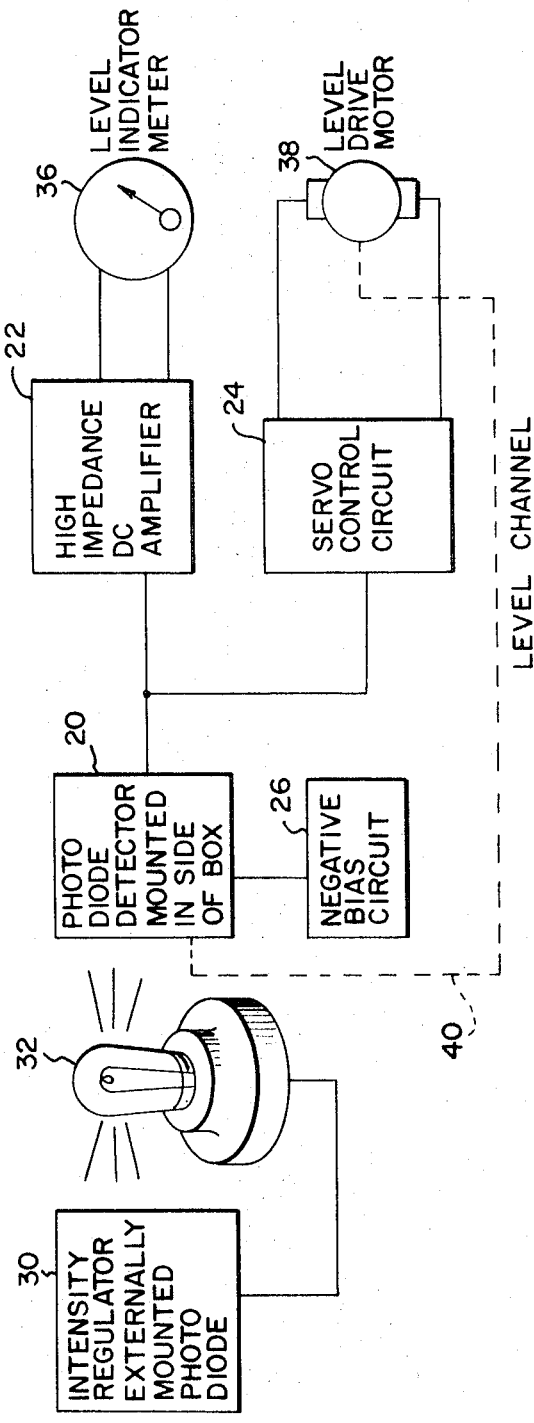
FIG. 3 is a block diagram showing part of a self-leveling control circuit incorporating the sensor of FIG. 1.

FIG. 3 is a block diagram showing the four electronic components in the level channel of the opto-electronic sensor and the corresponding external servo control circuits and drive motors for each channel. Identical circuitry would exist for the cross-level channel. The intensity regulator 30 shown in FIG. 3 controls the voltage to the incandescent lamp 32 on the basis of outputs from an externally mounted photosensitive diode which is located external to the mercury container and in line with the lamp 32. The external diode may be mounted in any convenient location as long as it is in line with the level and cross-level lamp 32. The intensity regulator 30 solves two problems. It allows the initial adjustment of and maintains the intensity of the lamp 32 so that the diode 20 output, regardless of its individual characteristics, will have the same constant output range thus eliminating the need for expensive matching pairs of detector diodes. Also the regulator 30 eliminates the expense of precision lamps in both channels giving constant illumination of equal intensity. The regulators in both channels will adjust the lamp voltages automatically from 15 to 30 volts in order to maintain initial intensities set by external diode adjustments.

The photodiode detector consists of a photosensitive diode 20 mounted in the wall of the box, as in FIG. 1, which when illuminated across the mercury surface, supplies current to a one megohm resistor. In order to damp out the high sensitivity to vibration of the system, a nonpolarized capacitor is placed across the detector output. This capacitor can be readily removed for the suggested stability or seismographic applications of the device.

The negative bias circuit 26 supplies the diode detector 20 with an adjustable negative voltage which allows a shift of the null, or level point, to the midpoint of the diode output. This adjustable null also provides limited control of small discrepancies in the 0.005 inch tolerance placed on the location of the diode mounting holes. Therefore if, when level, the mercury surface is such that a null is detected on the diode in one channel but slightly above or below a null on the other channel diode, the negative bias adjustment can be used to bring the latter diode output to a null. The DC amplifier 22 consists of two stages, the first of which uses a field effect transistor to provide a high input impedance for the one megohm resistor of the detectors. The amplifier 22 is coupled to a meter bias circuit which allows the meter to null at mid scale and eliminates any fluctuations of the meter because of power supply variations. The need for this meter bias can be eliminated by a well regulated supply and zero center meter. The input to the DC amplifier 22 is adapted to be switched independently to one of four positions; (1) ground, to allow zeroing of the meter via the meter bias, (2) low sensitivity which provides a plus or minus one milliradian meter reading accuracy, (3) high sensitivity which provides, in the case of the prototype embodiment, a plus or minus 0.02 milliradian reading accuracy, and (4) a regulator diode output to monitor lamp intensities.

The servo control circuit 24 consists of operational amplifiers with high input impedance and low output impedance driving a DC motor control circuit. The dashed line 40 indicates the mechanical feedback from the motor 28 to the opto-electrical sensor through the surface plate attached to the motor drive. In operation the first step in the calibration of the leveling system is to place the sensor on a surface plate which has been previously precision leveled. With the system turned on, the mercury is added to the box until the diode outputs are as near midrange as possible. Then both of the negative bias circuits 26 are adjusted to bring the diode outputs to the precise null desired. The intensity regulators 30 can be used to a small extent for this operation, but it must be remembered that changing the intensity not only changes the null point but also affects the range of the system. Therefore the intensity regulators where possible, should only be used to equalize the characterized of the two diodes. With the above operation completed the instrument will be ready for use.

The size of the photodiode determines the range over which the opto-electronic sensor will operate and can be varied according to the desired use of the sensor. A larger diameter diode will provide a larger operating range without sacrificing any accuracy. The accuracy can always be improved by increasing the amplification of the photodiode output.

The size of the incandescent lamps used in the device depends on the intensity required to obtain the desired diode output, hence the type of lamp should be chosen on the basis of the diode characteristics. The intensity regulators allow the use of inexpensive lamps such as GE 356,28 volt lamps used in the described embodiment.

It will be apparent that the embodiments shown are only exemplary and that various modifications can be made in construction and arrangement within the scope of the invention as defined in the appended claims.

I claim:
1. An opto-electronic liquid level sensor for maintaining a stable surface with respect to a reference plane, comprising:
   a. liquid containing means mounted upon said surface and comprising four walls each having a transparent portion therein;
   b. first illuminating means mounted on the outside of the transparent portion of the first wall of said liquid containing means;
   c. a first photosensitive semiconductor diode mounted on the outside of the transparent portion of the second wall of said liquid containing means for producing an electrical current proportional to the light falling thereon from said first illuminating means;
   d. second illuminating means mounted on the outside of the transparent portion of the third wall of said liquid containing means;
   e. a second photosensitive semiconductor diode mounted on the outside of the transparent portion of the fourth wall of said liquid containing means for producing an electrical current proportional to the light falling thereon from said second illuminating means;
   f. an opaque liquid contained within said liquid containing means to block a portion of the light from said first and second illuminating means which passes through said liquid containing means so that the portion of light being blocked from said first illuminating means is proportional to the deviation of said surface from a stable condition in the level direction and the portion of light being blocked from said second illuminating means is proportional to the deviation of said surface from a stable condition in the cross-level direction;
   g. first and second negative bias circuits for nulling out said electrical currents from said first and second diodes, respectively when said surface is in a stable condition with respect to said reference plane whereby a bidirectional null condition is established for said level and cross-level directions; and
   h. control means to utilize the output signals of said first and second diodes for maintaining said surface in a stable condition with respect to said reference plane.

2. The invention according to claim 1 wherein said control means comprises:
   a. first and second drive motors connected to said surface;
   b. a first servo control circuit to receive the output signal of said first diode for producing a control signal for said first drive motor that is proportional to the deviation of said first diode output signal from said null condition so that first drive motor will align said surface in a stable condition with respect to the level direction; and
   c. a second servo control circuit to receive the output signal of said second diode for producing a control signal for said second drive motor that is proportional to the deviation of said second diode output signal from said null condition so that said first drive motor will align said surface in a stable condition with respect to the cross-level direction.

3. The invention according to claim 2 wherein said first and second illuminating means are adjustable to provide varying intensities of light.

4. The invention according to claim 3 wherein the surface area of said first and second photosensitive diodes is proportional to the operating range of said sensor.

5. The invention according to claim 4 wherein said opaque liquid is mercury.